United States Patent
Fujiki

(10) Patent No.: US 6,717,586 B2
(45) Date of Patent: Apr. 6, 2004

(54) APPARATUS, METHOD, PROGRAM CODE, AND STORAGE MEDIUM FOR IMAGE PROCESSING

(75) Inventor: Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 09/819,668

(22) Filed: Mar. 29, 2001

(65) Prior Publication Data

US 2002/0118217 A1 Aug. 29, 2002

(30) Foreign Application Priority Data

Feb. 23, 2001 (JP) ........................................ 2001-048719

(51) Int. Cl.[7] ................................................. G09G 5/12
(52) U.S. Cl. ........................ 345/629; 382/284; 382/285
(58) Field of Search ................................ 345/629–641, 345/719–726; 348/73, 143, 211.8–211.14; 382/264, 268, 284–285

(56) References Cited

U.S. PATENT DOCUMENTS

| | | | | |
|---|---|---|---|---|
| 5,325,470 A | * | 6/1994 | Sumino et al. | 345/421 |
| 6,084,557 A | * | 7/2000 | Ishida et al. | 345/9 |
| 6,388,666 B1 | * | 5/2002 | Murray | 345/473 |
| 6,424,351 B1 | * | 7/2002 | Bishop et al. | 345/582 |
| 6,441,815 B1 | * | 8/2002 | McDowall et al. | 345/419 |
| 6,456,287 B1 | * | 9/2002 | Kamen et al. | 354/427 |

FOREIGN PATENT DOCUMENTS

| | | |
|---|---|---|
| JP | 2000-251090 | 9/2000 |
| JP | 2000-322594 | 11/2000 |
| JP | 2000-354257 | 12/2000 |
| WO | WO 00/52640 | 9/2000 |

* cited by examiner

Primary Examiner—Michael Razavi
Assistant Examiner—Thu-Thao Havan
(74) Attorney, Agent, or Firm—Fitzpatrick, Cella, Harper & Scinto

(57) ABSTRACT

An accumulation buffer is cleared (S501), an real image is input (S502), a color buffer is cleared (S503), and the real image is drawn in the color buffer (S504). Then the viewpoint (including parameters concerning the viewpoint) and the view volume of a virtual camera is set (S505) and a computer graphics image is drawn in the color buffer (S506). Then each pixel value of the image in the color buffer is scaled by a factor of 1/N (S507) and the scaled image is added to the accumulation buffer (S508). The process from step S503 to step S508 is repeated N times (S509) by moving the viewpoint position at step S505. An averaged image provided by averaging, on a pixel basis, N combined images stored in the accumulation buffer is output (S510).

42 Claims, 10 Drawing Sheets

APPARATUS, METHOD, PROGRAM CODE, AND STORAGE MEDIUM FOR IMAGE PROCESSING

FIELD OF THE INVENTION

The present invention relates to an apparatus, method, program code, and storage medium for image processing that combine a real image with a plurality of computer graphics images to generate a combined image.

BACKGROUND OF THE INVENTION

In the field of image processing technology, a real picture acquired by capturing a real scene with an image capture apparatus such as a camera is combined with computer graphics images of virtual objects to generate a combined image containing the virtual objects in an area where they do not exist in the real space, and the generated image is widely used in simulations, games, and other applications.

The picture by an image capture apparatus such as a camera is in focus on an object that exists on a plane (focal plane) at a certain distance from the image plane, within the depth of field of its optical system. Therefore, conventionally, when computer graphics images are combined with a real image captured by a camera, any object in the shot picture that does not exist within the depth of field is blurred, whereas all objects in the computer graphics images are in focus, producing a difference in picture quality between the shot picture and the computer graphics images. As a result, the combined image generated by combining the computer graphics images with the real image gives a feeling of strangeness to an observer.

The present invention is made in view of the above-mentioned problem and it is an object of the present invention to produce in a computer graphics image a blur which appears in a real image to generate a combined image of the computer graphics image with the shot picture that does not give a feeling of strangeness to an observer.

SUMMARY OF THE INVENTION

To achieve the object of the present invention, an image processing apparatus of the present invention has the following configuration, for example.

An image processing apparatus for combining a real image with computer graphics image to generate a combined image, comprising:

setting means for setting the moving distance of a viewpoint and the position of a focal plane for generating the computer graphics image;

computer graphics image generation means for moving the viewpoint based on the moving distance of the viewpoint set by the setting means to generate the computer graphics image based on the moved viewpoint;

combined image generation means for combining the computer graphics image generated by the computer graphics image generation means with the real image to generate the combined image; and average image generation means for generating a combined image containing an averaged computer graphics image of computer graphics images contained in a plurality of combined images generated by the combined image generation means corresponding to each of the viewpoints.

To achieve the object of the present invention, an image processing apparatus of the present invention has the following configuration, for example.

An image processing apparatus for combining a real image with a computer graphics image to generate a combined image, comprising:

calculation means for calculating the moving distance of a viewpoint and the position of a focal plane for generating the computer graphics image according to the lens characteristics of image capture means for capturing a real image;

computer graphics image generation means for moving the viewpoint based on the moving distance of the viewpoint calculated by the calculation means to generate the computer graphics image based on the moved viewpoint;

combined image generation means for combining the computer graphics image generated by the computer graphics image generation means with the real image to generate the combined image; and average image generation means for generating a combined image containing an averaged computer graphics image of computer graphics images contained in a plurality of combined images generated by the combined image generation means corresponding to each of the viewpoints.

To achieve the object of the present invention, an image processing apparatus of the present invention has the following configuration, for example.

An image processing apparatus for combining a real image with computer graphics image to generate a combined image, comprising:

setting means for setting the moving distance of a viewpoint and the position of a focal plane for generating the computer graphics image;

computer graphics image generation means for moving the viewpoint based on the moving distance of the viewpoint set by the setting means to generate the computer graphics image based on the moved viewpoint, the computer graphics image generation means generating a plurality of computer graphics images corresponding to the viewpoints;

averaged computer graphics image generation means for generating an averaged computer graphics image, the average computer graphics image being an average of the plurality of computer graphics images; and combined image generation means for combining the averaged computer graphics image generated by the averaged computer graphics image generation means with the real image to generate a combined image.

To achieve the object of the present invention, an image processing apparatus of the present invention has the following configuration, for example.

An image processing apparatus for combining a real image with computer graphics image to generate a combined image, comprising:

calculation means for calculating the moving distance of a viewpoint and the position of a focal plane for generating the computer graphics image according to the lens characteristics of a image capture means for capturing a real image;

computer graphics image generation means for moving the viewpoint based on the moving distance of the viewpoint calculated by the calculation means to generate the computer graphics image based on the moved viewpoint;

the computer graphics image generation means generating a plurality of computer graphics images corresponding to the viewpoints;

averaged computer graphics image generation means for generating an averaged computer graphics image, the average computer graphics image being an average of the plurality of computer graphics images; and combined image generation means for combining the averaged computer graphics image generated by the averaged computer graphics image generation means with the real image to generate a combined image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
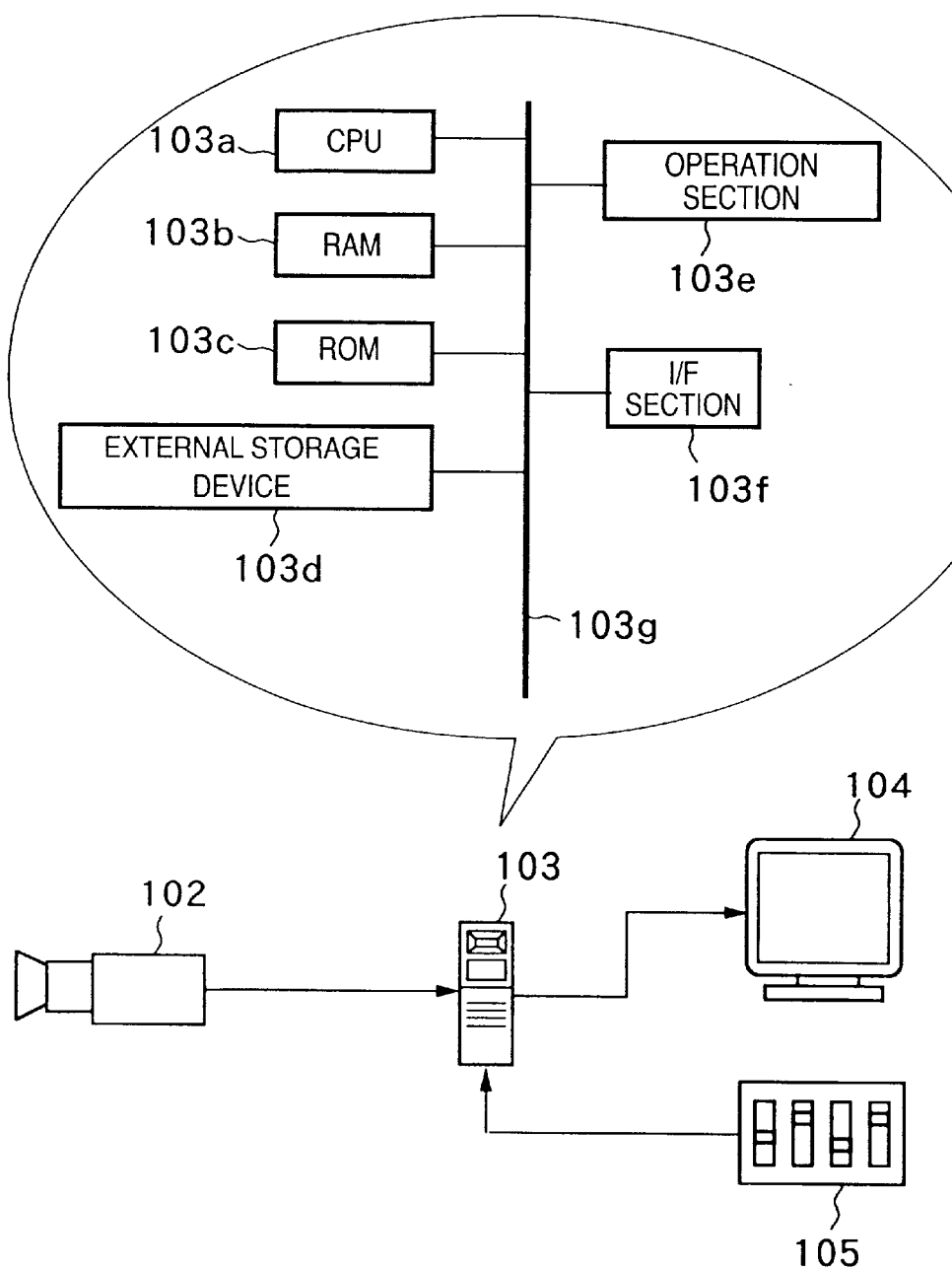
FIG. 1 shows a configuration of an image processing apparatus according to a first embodiment of the present invention.

A configuration of an image processing system according to a first embodiment is shown in FIG. 1 and will be described below. Reference number 102 indicates a camera as an image capture apparatus for capturing a real scene and outputting the real picture (hereinafter called "real image") of the real scene captured by said image capture apparatus to a computer 103. The computer 103 performs a process for combining the real image input from the camera 102 with a computer graphics image generated within the computer 103 and a process for outputting the combined image to a display 104. The internal basic configuration of the computer 103 will be described.

Reference number 103a is a central processing unit (CPU) for reading a program, data and the like stored in memory such as RAM 103b and ROM 103c to perform various processes, which will be described later. The CPU also performs other processes such as the control of the entire computer 103.

The RAM 103b includes an area for temporarily storing a program loaded from an external storage device 103d and data and a working area used when the CPU 103a executes a process.

The ROM 103c stores a boot program for the computer 103 and settings of the computer 103.

The external storage device 103d stores a program and data read from a storage medium such as a CD-ROM and floppy disk. If the size of a working area used by the CPU 103 a exceeds the size of the working area in the RAM 103B, the external storage device 103d can stores the exceeding amount of the working area as a file Reference number 103 indicates an operation section 103e consisting of a keyboard and pointing device such as a mouse, through which various instructions can be input into the computer 103.

Reference number 103f is an interface section (I/F section) for connecting to a peripheral device and a network.

Reference number 103g is a bus interconnecting the above-mentioned components.

Reference number 104 indicates a display consisting of a cathode-ray-tube (CRT) or a liquid-crystal display and on which a combined image output from the computer 103 can be displayed.

Reference number 105 indicates a valuator, which is an operation section controlling parameters for generating a blur, which will be described later.

A process for generating a combined image by using the image processing apparatus having the above-described configuration will be described below.

Figure 2:
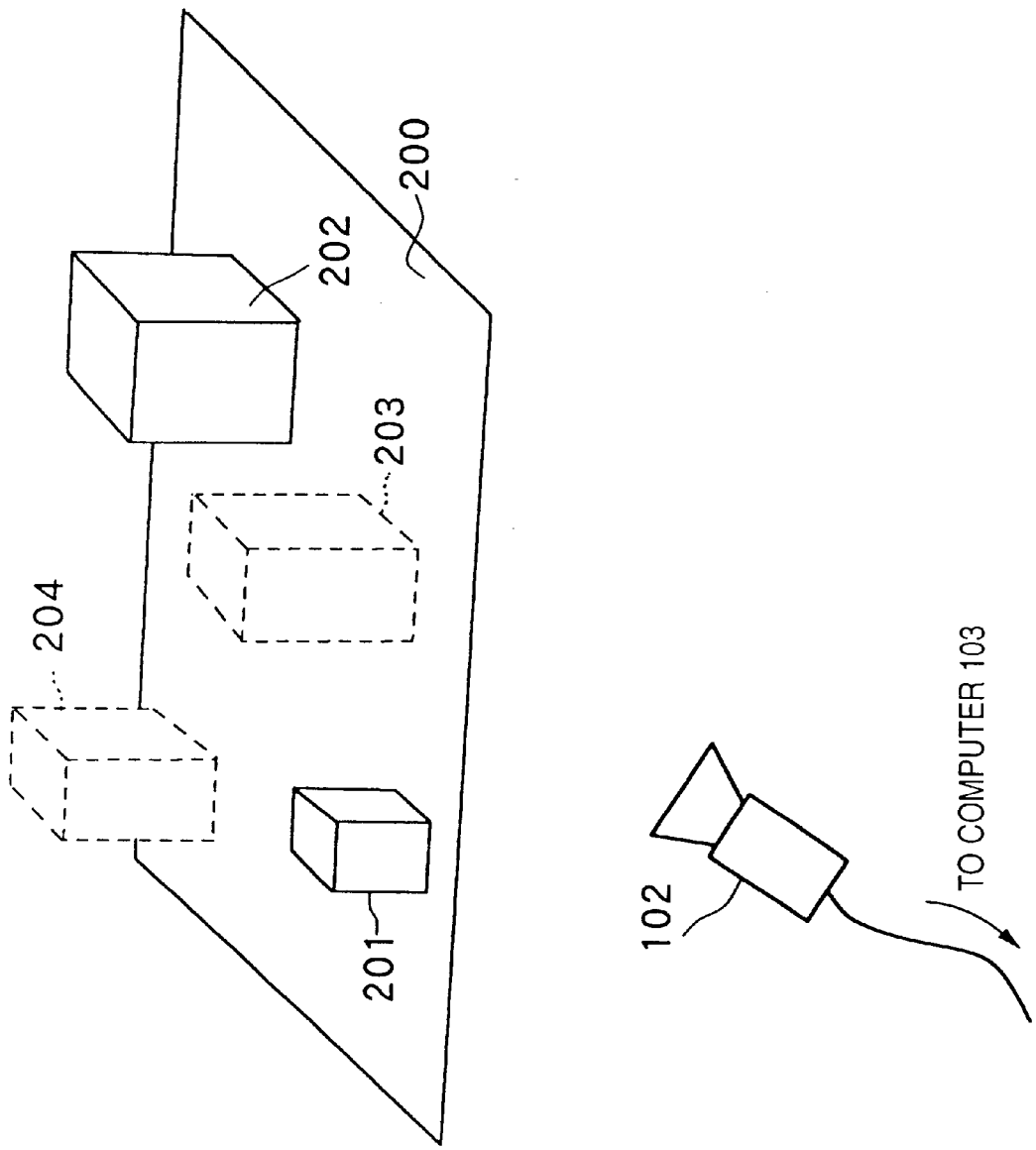
FIG. 2 is a schematic diagram showing how a real scene is shot.

FIG. 2 is a schematic diagram showing how a real scene is shot. It is assumed that the parameters (position, orientation, depth of field, and other parameters) of the camera 102 are preset and stored in the external storage device 103d or the memory such as the RAM 103b in the computer 103. Data about virtual objects (the shape, texture, and other data about the virtual objects) is also stored in the external storage device 103d or the memory such as RAM 103b. A method for generating the images (computer graphics images) of the virtual objects is not limited to a specific method.

Real objects 201, 202 are provided in the field 200 of the real space in FIG. 2. Reference numbers 203 and 204 indicate virtual objects generated within the computer 103 and do not exist in the field 200 and are not captured by the camera 102. However, the field 200 of the real space, real objects 201, 202, and virtual objects 203, 204 are contained in a combined image generated within the computer 103.

The images (computer graphics images) of the virtual objects 203, 204 in that case are images viewed from a virtual camera having the same position and orientation as those of the camera 102.

When a combined image is generated according to a prior art, a blur appears on an object in the shot picture that does not exist within the depth of field, whereas the computer graphics images are in focus on all the virtual objects. Therefore, in order for the combined image of the computer graphics images and the real image not to provide a feeling of strangeness, it is required that reasonable blurs are produced on the computer graphics images. A process for producing a blur on a computer graphics image will be described below.

Figure 4:
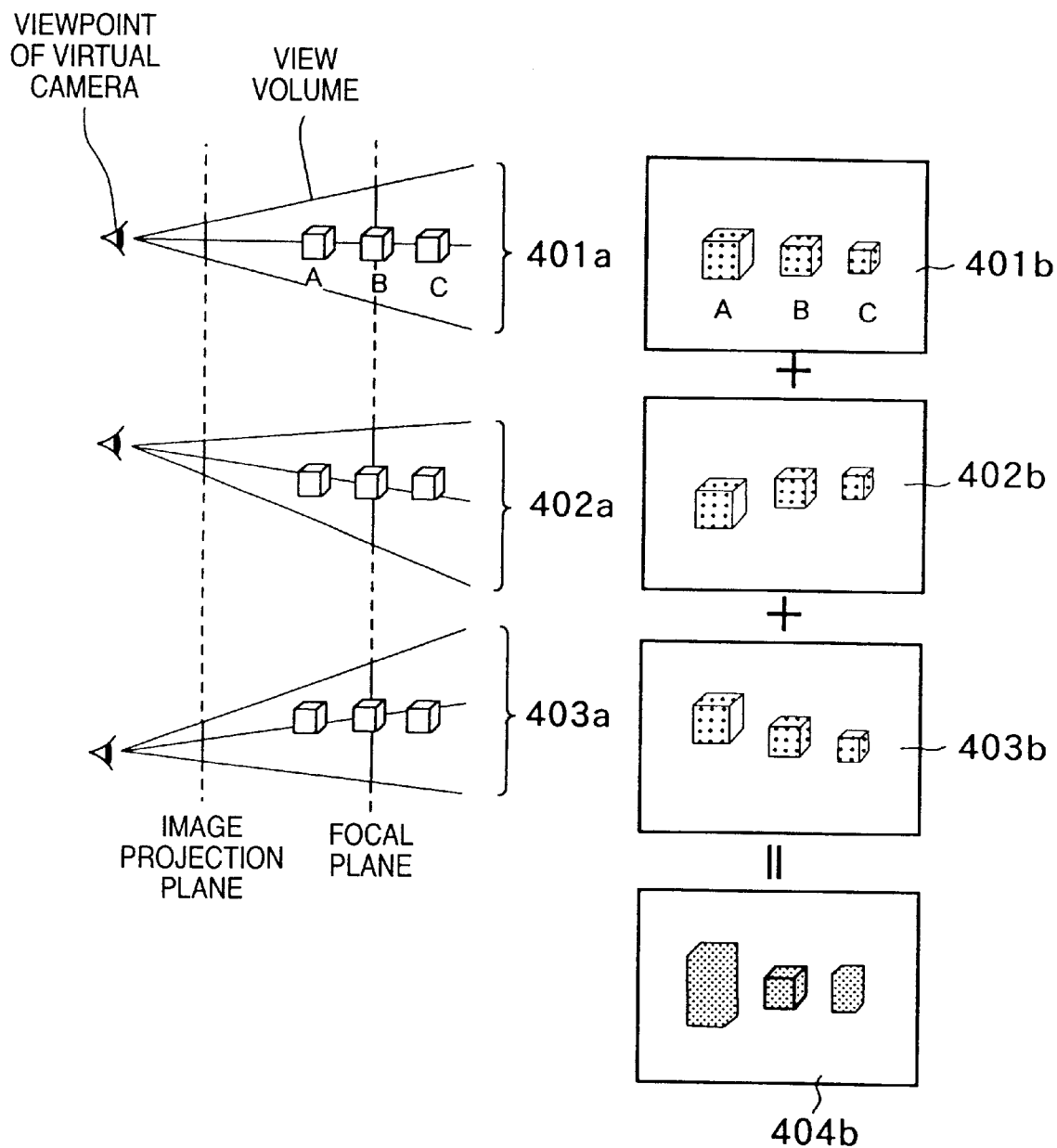
FIG. 4 is a diagram showing how a blur is produced on the computer graphics image.

FIG. 4 shows a method for producing the blur on the computer graphics image. 401a, 402a, and 403a are schematic diagrams showing virtual objects A, B, and C viewed by moving the viewpoint of a virtual camera, respectively. 401b, 402b, and 403b are images projected on the projection plane of images based on the viewpoints shown in FIGS. 401a, 402a, and 403a, respectively. In FIG. 4, object B is positioned on a plane on which the camera is brought into focus (focal plane).

The average (an image formed by averaging the pixel values of the three computer graphics images) of the computer graphics images 401b, 402a, and 403b obtained as described above is calculated to obtain an image 404b. When this image is viewed, the images of virtual objects A and C which are not on the focal plane are blurred, producing the effect of pseudo depth of field.

Figure 3:
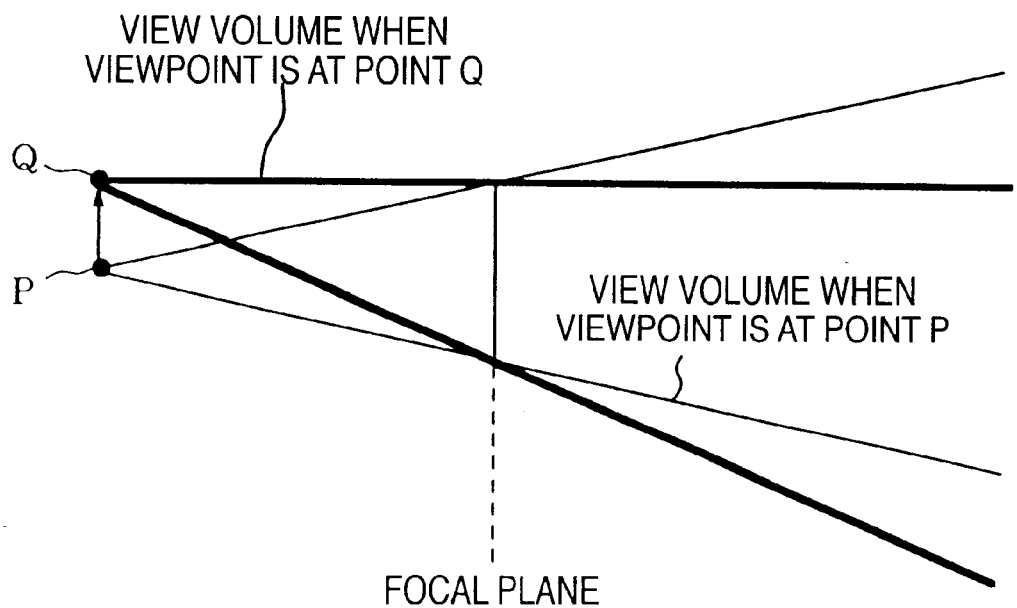
FIG. 3 is a diagram illustrating the movement of a viewpoint for producing a blur on a computer graphics image.

The movement of the viewpoint will be described with respect to FIG. 3. If the position of the viewpoint is at point P, which is a standard point, and a focal plane is set as shown in FIG. 3, the view volume would be as shown. Then, when the position of view point is moved to point Q, which is an offset from the standard, the view volume must be re-set. It is required that the cross-section of the re-set view volume cut at the focal plane in this case is identical to the cross-section of the view volume cut at the focal plane in the previous case in which the viewpoint is at point P, as shown in FIG. 3.

In this way, as the viewpoint is moved from the base position horizontally and vertically (moved from the viewpoint position shown in diagram 401a upward (402a) or downward (403a) in the example shown in FIG. 4), and a computer graphics image is obtained each time the viewpoint is moved, then calculate an average image of the obtained computer graphics images. By doing this, an image can be provided in which the farther a virtual object from the focal plane, the higher the level of blur of the image of the virtual object. The level of blur varies depending on the position of the focal plane and the moving distance of the viewpoint. Therefore, the level of blur of a computer graphics image can be controlled by making these parameters controllable by a valuator 105. The number of movements of the viewpoint, that is, the number of computer graphics images required for generating a blurred computer graphics image should be determined according to the computing ability and drawing ability of the computer 103. Typically, the more the number of computer graphics images, the more natural the gradation of blurred computer graphics images. Because the blur is produced in a direction in which the viewpoint moves, it is preferable that the viewpoint is moved in the diagonal direction in addition to the vertical and horizontal directions in order to generate a more naturally burred computer graphic image.

When the image processing apparatus of the present embodiment generates blurred computer graphics images by using the above-described method, the computer graphics images, images 401b, 402b, and 403b shown in FIG. 4, for example, are sequentially stored in a predetermined buffer (color buffer) within the RAM 103b. Then a process is performed on the computer graphics images stored sequentially for multiplying all the pixel values by a factor of one third. Then, they are transferred to another buffer (hereinafter called "accumulation buffer") and added to computer graphics images previously stored in the accumulation buffer on pixel-by-pixel basis. As a result, an image provided by averaging computer graphics images 401b, 402b, and 403b is ultimately stored in the accumulation buffer. This process is performed by the computer 103. The computer 103 outputs the average image of the computer graphics images 401b, 402b, and 403b to the display 104.

If the computer 103 is used in the form of a board dedicated to image processing, the buffers may be provided in separate RAMs, such as RAM dedicated to the color buffer and RAM dedicated to the accumulation buffer.

Figure 5:
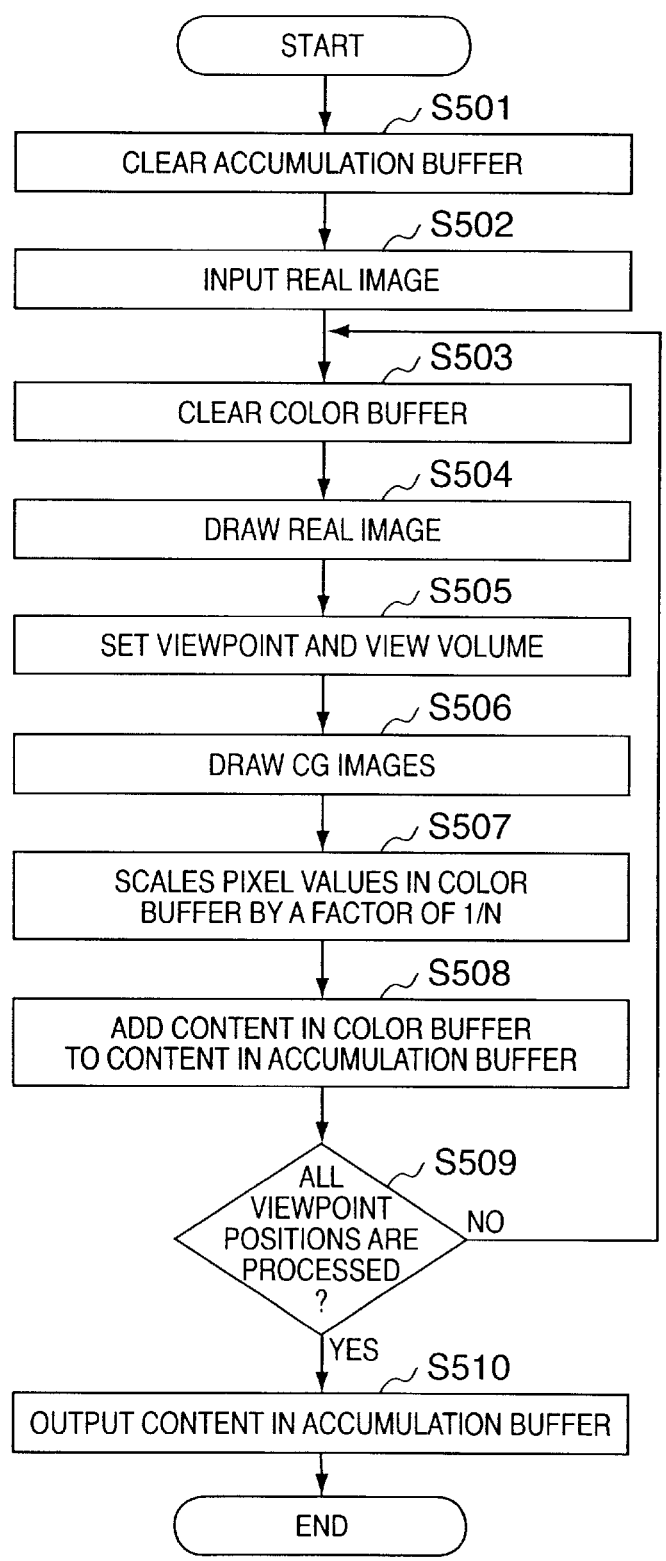
FIG. 5 is a flowchart of a process performed by the image processing apparatus according to the first embodiment of the present invention.

The flowchart of the above-described process performed by the image processing apparatus in the present embodiment is shown in FIG. 5 and the process will be described below with reference to the flowchart.

First, the accumulation buffer is cleared (step S501). Then the color buffer is cleared (step S502). A real image is input from the camera 102 at step S503 and the real image is drawn in the color buffer in the RAM 103b (step S504). Then, the viewpoint (including parameters concerning the viewpoint) and view volume of a virtual camera are set (step S505) and a computer graphics image is drawn in the color buffer in the RAM 103b (step S506). That is, the computer graphics image is combined with the real image previously stored in the color buffer to produce a combined image. Then, each pixel value of the image stored in the color buffer is scaled by a factor of 1/N (N=3 in the example shown in FIG. 3) (step S507). The scaled image is transferred to the accumulation buffer (step S508).

The first image transferred to the accumulation buffer after it is cleared is copied to the accumulation buffer as it is. The subsequent images transferred to the accumulation buffer are added to the image previously transferred on pixel-by-pixel basis. If data 0 has been written in the accumulation buffer at step S501, the image transferred to the accumulation buffer is added from the beginning. The process at steps S501 and 502 in particular are to write data 0 into each buffer. In the drawing process at steps S504 and S506, the depths from the viewpoint are compared with each other to generate an image in which hiding relationship between images to be drawn is reflected.

The process from step S504 to S508 is repeated N times (step S509) while moving the position of the viewpoint at step S505. Moving distance set by the valuator 105 is read and used in moving the viewpoint position at step S505. The position of focal point set by the valuator 105 is also read and used. The view volume is uniquely determined from the position of a cross section of the view volume cut by the focal plane and the position of the viewpoint.

As a result, an image provided by averaging, on a pixel basis, N combined images provided by the process form step S503 to S508 is stored in the accumulation buffer. This image is output to the display 104 (step S510).

Figure 10:
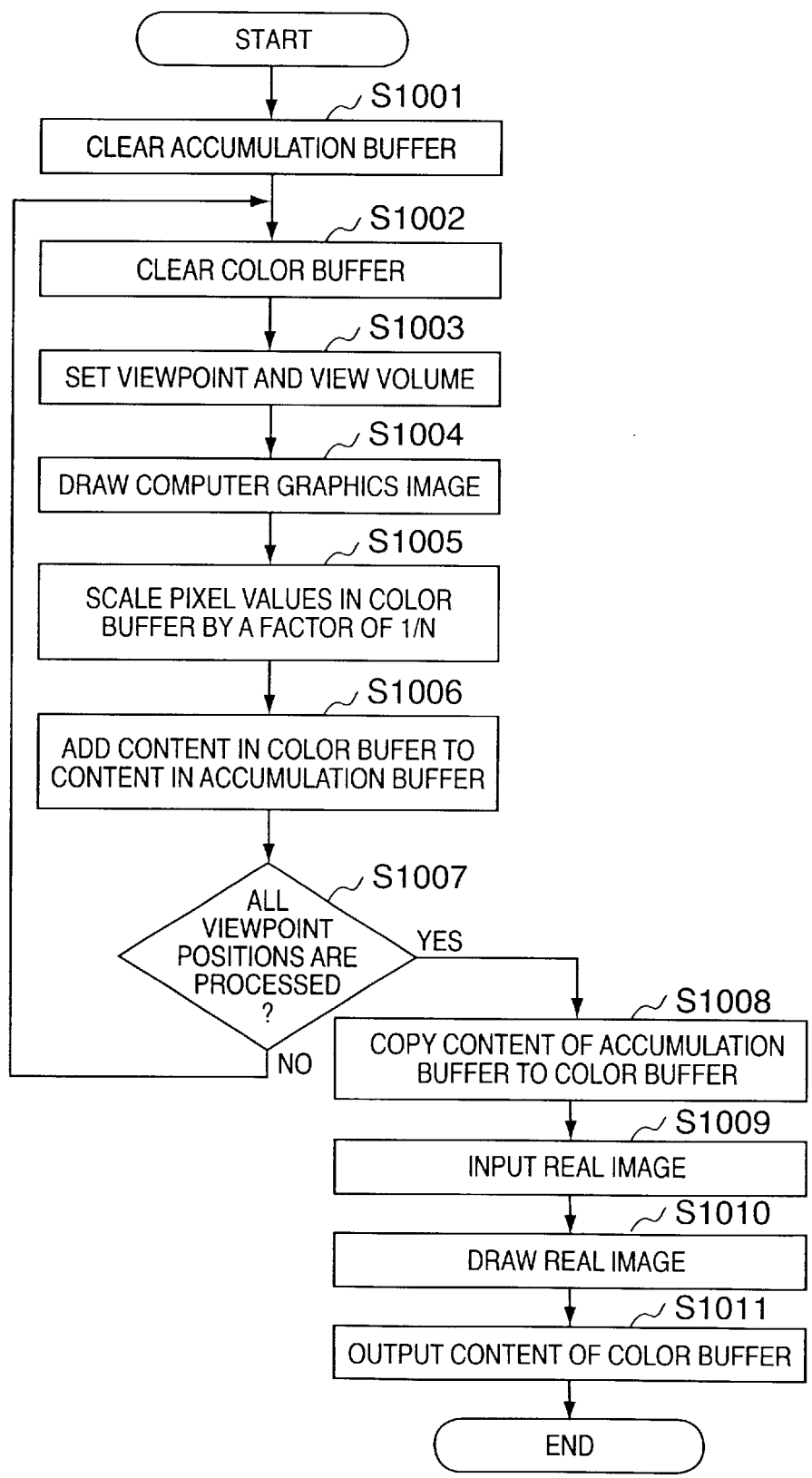
FIG. 10 is a flowchart of an alternative process performed by the image processing apparatus according to the first embodiment of the present invention.

While the process according to the flowchart uses a plurality of combined images of computer graphics images and a real image to generate a combined image in which the computer graphics images are blurred, the method is not limited to this process. Instead, a plurality of computer graphics images are used to generate blurred computer graphics images, and finally these images are combined with a real image. This process is shown in a flowchart in FIG. 10. The process at steps S1001, S1002, S1003, S1004, S1005, S1006, S1007, S1009, and S1010 in FIG. 10 is the same as that at the steps S501, S503, S505, S506, S507, S508, S509, S502, and S504 in FIG. 5. At step S1008, N combined images stored in an accumulation buffer are averaged on a pixel basis and, the resulting images are copied to a color buffer. When a real image is drawn at step S1010, a combined image is drawn in which hiding and transparency relationships between the real image and computer graphics objects are reflected. The combined image is output to a display 104 at step S1011.

While in the processes according to the flowcharts in FIG. 5 and FIG. 10, computer graphics image with respect to the virtual viewpoints are equally averaged, the ratio of contribution of the computer graphics images to the output combined image may be varied depending on viewpoints. For example, a combined image (in the process shown in the flowchart in FIG. 5) or a computer graphics image (in the process shown in the flowchart in FIG. 10) with a less moving distance from the standard viewpoint position may have a higher contribution ratio.

As described above, the image processing apparatus and method according to the present invention can implement blurs according to depths of field by computer graphics images and provide a combined image of a real image with computer graphics images that does not provide a feeling of strangeness to an observer.

While the present embodiment has been described with respect to the real image and computer graphics images that are still images or images of one frame of the moving image, the present embodiment can be applied to a real image and computer graphics images that are moving images. In that case, the process shown in FIG. 5 or FIG. 10 may be performed on each frame of the moving image.

Second Embodiment

The valuator 105, which is hardware, is used to determine the moving distance of the viewpoint and the position of the focal plane of the virtual camera in the first embodiment, the valuator 105 may be implemented by software. That is, the valuator 105 is represented by a graphics user interface (GUI) and the operation section 103e is used to specify the moving distance and focal plane of the virtual camera.

In addition, the moving distance and the position of the focal plane of the virtual camera may be written in a file such as a configuration file and stored in the RAM 103b or the external storage device 103d beforehand. The configuration file may be open and the settings may be changed by using the operation section 103e when necessary.

Third Embodiment

Figure 6:
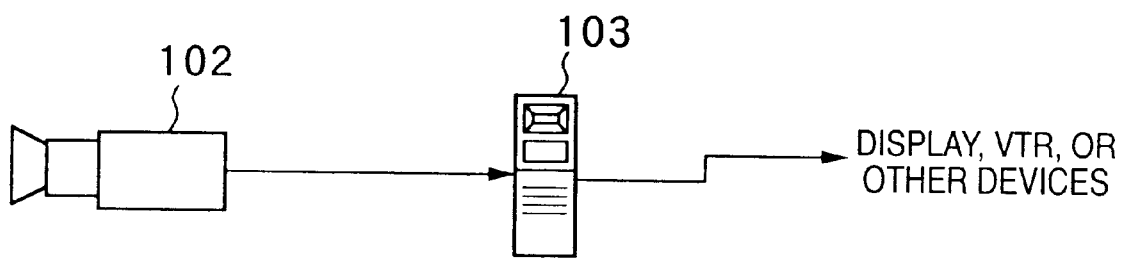
FIG. 6 shows a configuration of an image processing apparatus according to a second embodiment of the present invention.

While blur parameters are controlled by the valuator 105 in the first embodiment, the parameters may be calculated based on parameters for the camera 102, in particular, settings for its lens. In this case, the configuration of an image processing apparatus according to a third embodiment will be as shown in FIG. 6. In FIG. 6, the same reference numbers are applied to the same components as those of the image processing apparatus shown in FIG. 1.

According to the image processing apparatus according to the present embodiment shown in FIG. 6, parameters for a camera 102, in particular, settings for its lens are stored in an external storage device 1 103d in a computer 103. When a real image is input to the computer 103 through the camera 102, the stored lens settings are used to calculate parameters for generating a blurred computer graphics image. Then a process similar to the method described with respect to the first embodiment is performed to output a combined image of burred computer graphics images with a real image to a display 104, VTR, or other devices.

The method for calculating the parameters from the lens settings of the camera 102 for generating computer graphics images will be described below.

According to the calculation method of the present embodiment, first the position of the focal plane of the computer graphics drawing system is calculated so that the focal plane position of the computer graphics drawing system is brought into coincidence with the focal plane position of the real image capture system. Then, a virtual base point is provided at any position that is the same for the computer graphics drawing system and the real image capture system and different from the position of the focal plane. Then the moving distance of the viewpoint for the computer graphics drawing system is calculated so that the blur on the image of an object at this base point drawn by the computer graphics drawing system matches the blur of the real image of the object.

Figure 7:
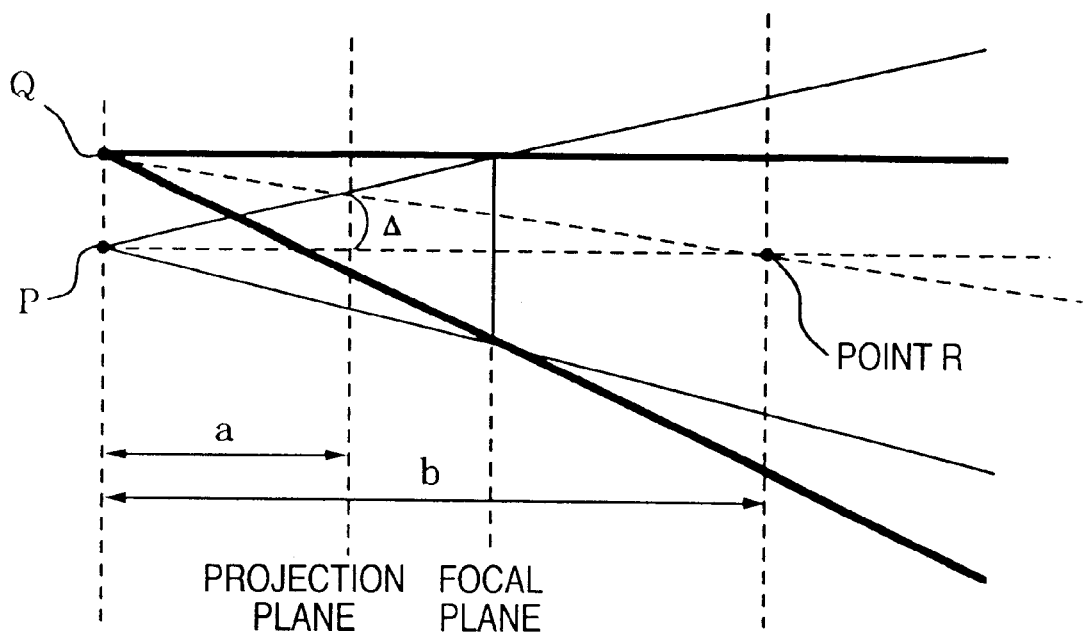
FIG. 7 shows a computer graphics drawing system.

FIG. 7 shows the computer graphics system. In FIG. 7, points P and Q indicate the positions of view points and point R is a point which is projected in the center of the capture plane in viewpoint position P, which is a base position, and provided at any point other than the focal plane. When the viewpoint position is moved from point P to point Q, the amount of difference, $\Delta$, of point R on the projection plane is expressed by the following equation:

$$\Delta = (1 - a/b) \times PQ$$

Figure 8:
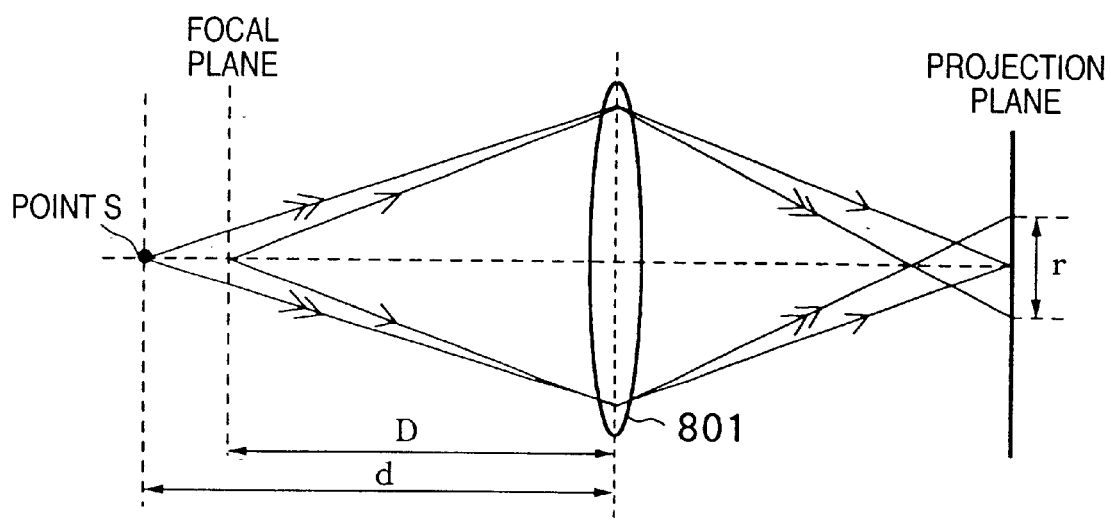
FIG. 8 shows a shot picture drawing system.

FIG. 8 shows the real image capture system. In FIG. 8, reference number 801 indicates a lens. If a focal plane and projection plane are provided and a point at a distance of D from the lens 801 is projected in the position on the projection plane as shown in FIG. 8, then the diameter r of a circle produced on the projection plane by the projection of point S at a distance of d from the lens 801 is expressed by the following equation:

$$r = f/\{F(D-f)\} \times (1 - D/d).$$

where f is the focal length of the lens 801 and F is the stop number. To match the blur of the computer graphics drawing system to the blur of the real image capture system, the position of the focal plane of the computer graphics drawing system is brought into coincidence with that of the real image capture system to calculate the position of the focal plane of the computer graphics drawing system. Then point R is brought into coincidence with point S as the base point and the moving distance of the virtual camera is determined so as to meet a relational expression, $r = 2k\Delta$, where k is a transformation coefficient for matching the size of the computer graphics image to that of the real image. As described above, the position of the focal plane and the moving distance of the viewpoint position are uniquely determined if the parameters for the camera 102 are determined. Therefore, the computer can determine a parameter for controlling the blue of a computer graphics image from the parameters of the camera 102 which are held within the computer 103.

Parameters for setting a blur is calculated as described above and stored in the RAM 103b or the external storage device 103d before the process in the flowchart shown in FIG. 5 and used in the process for setting the viewpoint at step S505 or S1003. The moving distance of the viewpoint calculated by the above-described method is used as the upper limit, which is set at step S505 or S1003, of distance of the viewpoint position from the standard viewpoint position.

While in the process by the image processing apparatus according to the present embodiment a plurality of combined images of the computer graphics images and the real image are used to generate a combined image in which the computer graphics images are blurred, the embodiment is not limited to this process. A plurality of computer graphics images are used to generate a computer graphics image and the resulting computer graphics image is ultimately combined with a real image.

Fourth Embodiment

Figure 9:
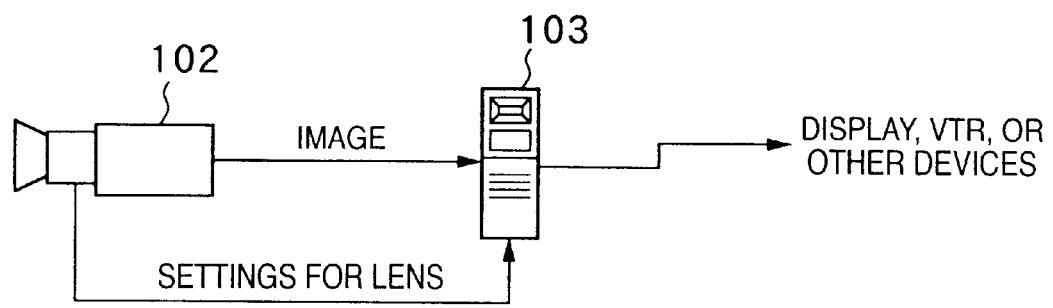
FIG. 9 shows a configuration of an image processing apparatus according to a third embodiment of the present invention.

The lens settings for the camera 102 of the image processing apparatus provided in the third embodiment are fixed. An image processing system in which lens settings are variable will be described with respect to a fourth embodiment. FIG. 9 shows the image processing apparatus according to the fourth embodiment. In FIG. 9, the same reference numbers are applied to the same components as those shown in FIG. 6. The image processing apparatus shown in FIG. 9 is different from the image processing apparatus shown in FIG. 6 in that settings for the lens of a camera 102 are input from the camera 102 to a computer 103. With this configuration, if the lens settings of the camera 102 are changed in real time, the changed settings are input to the computer 103 sequentially and input settings can be used to calculate parameters for generating a blurred computer graphics image. The calculation method is the same as that described in the third embodiment. The calculation is performed at step S505 in the flowchart shown in FIG. 5 or step S1003. The read process of the lens settings is performed at step S502 or step S1009. The rest of the process is the same as that performed by the image processing apparatus described with respect to the third embodiment. The lens settings input from the camera 102 to the computer 103 in the fourth embodiment are the focal length, the position of the focal plane, and the stop number. Any or all of these parameters may be substituted with other values, such as the angle of rotation of a motor driving a zoom lens, for example, that can be used for calculating the focal length, position of focal plane, and stop number in combination with the design specifications of the lens and the results of the calibration of the camera 102.

Fifth Embodiment

According to the image processing apparatus shown in the second and third embodiments the parameters for generating a blurred computer graphics image are calculated based on the lens settings of the camera 102 as described above. The fine control of the parameters may be performed for generating a highly blurred computer graphics image by providing a valuator 105.

While in the above-described embodiments, the means for averaging computer graphics image in a plurality of viewpoints are used as means for providing a blur to the computer graphics image corresponding to the position on the focal plane, the blur may be provided by a process for applying a low-pass filter to a computer graphics image.

In addition, computer graphics images to which a sequence of levels of blur are added may be stored beforehand and a computer graphics image having an appropriate blur may be selected form them according to the relation of the position in which the computer graphics image is generated to the position of the focal plane, in a simple process in which variations in the viewpoint position are small.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts (FIG. 7 and/or FIG. 9) described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for combining a real image with computer graphics image to generate a combined image, comprising:

setting means for setting the moving distance of a viewpoint and the position of a focal plane for generating the computer graphics image;

computer graphics image generation means for moving said viewpoint based on the moving distance of said viewpoint set by said setting means to generate the computer graphics image based on the moved viewpoint;

combined image generation means for combining the computer graphics image generated by said computer graphics image generation means with the real image to generate the combined image; and average image generation means for generating a combined image containing an averaged computer graphics image of computer graphics images contained in a plurality of combined images generated by said combined image generation means corresponding to each of the viewpoints.

2. An image processing apparatus for combining a real image with a computer graphics image to generate a combined image, comprising:

calculation means for calculating the moving distance of a viewpoint and the position of a focal plane for generating the computer graphics image according to the lens characteristics of image capture means for capturing a real image;

computer graphics image generation means for moving said viewpoint based on the moving distance of said viewpoint calculated by said calculation means to generate the computer graphics image based on the moved viewpoint;

combined image generation means for combining the computer graphics image generated by said computer graphics image generation means with the real image to generate the combined image; and average image generation means for generating a combined image containing an averaged computer graphics image of computer graphics images contained in a plurality of combined images generated by said combined image generation means corresponding to each of the viewpoints.

3. The image processing apparatus according to claim 1, further comprising display means for displaying the image generated by said average image generation means.

4. The image processing apparatus according to claim 1, further comprising control means for controlling the moving distance of the viewpoint and the position of the focal plane in the computer graphics image.

5. The image processing apparatus according to claim 1, wherein said combined image generation means stores the generated combined image in first memory and said average image generation means performs predetermined scaling for the value of pixels constituting the combined image stored in said first memory and adds the values of the pixels to the values of corresponding pixels of an image stored in second memory different from said first memory to re-store the image.

6. The image processing apparatus according to claim 5, wherein said average image generation means generates an image having the average of the pixel values of pixels in the same position in a plurality of combined images corresponding to said viewpoints.

7. The image processing apparatus according to claim 5, wherein said average image generation means generates an image having the weighted average of the pixel values of pixels in the same position in a plurality of combined images corresponding to said viewpoints.

8. The image processing apparatus according to claim 5, wherein said first memory is a color buffer and said second memory is an accumulation buffer.

9. An image processing apparatus for combining a real image with computer graphics image to generate a combined image, comprising:

setting means for setting the moving distance of a viewpoint and the position of a focal plane for generating the computer graphics image;

computer graphics image generation means for moving said viewpoint based on the moving distance of said viewpoint set by said setting means to generate the computer graphics image based on the moved viewpoint, said computer graphics image generation means generating a plurality of computer graphics images corresponding to the viewpoints;

averaged computer graphics image generation means for generating an averaged computer graphics image, said averaged computer graphics image being an average of said plurality of computer graphics images; and combined image generation means for combining said averaged computer graphics image generated by said averaged computer graphics image generation means with the real image to generate a combined image.

10. An image processing apparatus for combining a real image with computer graphics image to generate a combined image, comprising:

calculation means for calculating the moving distance of a viewpoint and the position of a focal plane for generating the computer graphics image according to the lens characteristics of an image capture means for capturing a real image;

computer graphics image generation means for moving said viewpoint based on the moving distance of said viewpoint calculated by said calculation means to generate the computer graphics image based on the moved viewpoint;

said computer graphics image generation means generating a plurality of computer graphics images corresponding to the viewpoints;

averaged computer graphics image generation means for generating an averaged computer graphics image, said averaged computer graphics image being an average of said plurality of computer graphics images; and combined image generation means for combining said averaged computer graphics image generated by said averaged computer graphics image generation means with the real image to generate a combined image.

11. The image processing apparatus according to claim 9, further comprising display means for displaying said combined image generated by said combined image generation means.

12. The image processing apparatus according to claim 9, further comprising control means for controlling the moving distance of the viewpoint and the position of the focal plane in the computer graphics image.

13. The image processing apparatus according to claim 9, wherein said averaged computer graphics image generation means stores the generated computer graphics image in first memory, performs predetermined scaling for the value of pixels constituting said computer graphics image and adds the values of the pixels to the values of corresponding pixels of an image stored in second memory different from said first memory to re-store the image.

14. The image processing apparatus according to claim 13, wherein said averaged computer graphics image generation means generates an image having the average of the pixel values of pixels in the same position in a plurality of computer graphics images corresponding to said viewpoints.

15. The image processing apparatus according to claim 13, wherein said averaged computer graphics image generation means generates an image having the weighted average of the pixel values of pixels in the same position in a plurality of computer graphics images corresponding to said viewpoints.

16. The image processing apparatus according to claim 1, wherein said computer graphics generation means re-sets a view volume so that the cross section of the view volume cut through the focal plane position does not change when said viewpoint is moved according to the moving distance of said viewpoint.

17. The image processing apparatus according to claim 2, wherein said calculation means calculates the position of the focal plane of a computer graphics drawing system so that the focal plane position of the computer graphics drawing system is brought into coincidence with the focal plane of a image capture system and provides virtual base points in the computer graphics drawing system and the image capture system in any position different from the focal plane and common to the computer graphics drawing system and the image capture system to calculate the moving distance of the viewpoint so that the blur level at said base point in said computer graphics drawing system become equal to the blur level at said base point in said image capture system.

18. A image processing method for combining a real image with a computer graphics image to generate a combined image, comprising:
the setting step of setting the moving distance of a viewpoint and the position of a focal plane for generating the computer graphics image;
the computer graphics image generation step of moving said viewpoint based on the moving distance of said viewpoint set at said setting step to generate the computer graphics image based on the moved viewpoint;
the combined image generation step of combining the computer graphics image generated at said computer graphics image generation step with the real image to generate the combined image; and
the average image generation step of generating a combined image containing an averaged computer graphics image of computer graphics images contained in a plurality of combined images generated at said combined image generation step corresponding to each of the viewpoints.

19. An image processing method for combining a real image with a computer graphics image to generate a combined image, comprising:
the calculation step of calculating the moving distance of a viewpoint and the position of a focal plane for generating the computer graphics image according to the lens characteristics of image capture means for capturing a real image;
the computer graphics image generation step of moving said viewpoint based on the moving distance of said viewpoint calculated at said calculation step to generate the computer graphics image based on the moved viewpoint;
the combined image generation step of combining the computer graphics image generated at said computer graphics image generation step with the real image to generate the combined image; and
the average image generation step of generating a combined image containing an averaged computer graphics image of computer graphics images contained in a plurality of combined images generated at said combined image generation step corresponding to each of the viewpoints.

20. The image processing method according to claim 18, further comprising the display step of displaying the image generated at said average image generation step.

21. The image processing method according to claim 18, further comprising the control step of controlling the moving distance of the viewpoint and the position of the focal plane in the computer graphics image.

22. The image processing method according to claim 18, wherein said combined image generation step stores the generated combined image in first memory and said average image generation step performs predetermined scaling for the value of pixels constituting the combined image stored in said first memory and adds the values of the pixels to the values of corresponding pixels of an image stored in second memory different from said first memory to re-store the image.

23. The image processing method according to claim 22, wherein said average image generation step generates an image having the average of the pixel values of pixels in the same position in a plurality of combined images corresponding to said viewpoints.

24. The image processing method according to claim 22, wherein said average image generation step generates an image having the weighted average of the pixel values of pixels in the same position in a plurality of combined images corresponding to said viewpoints.

25. The image processing method according to claim 22, wherein said first memory is a color buffer and said second memory is an accumulation buffer.

26. An image processing method for combining a real image with computer graphics image to generate a combined image, comprising:
the setting step for setting the moving distance of a viewpoint and the position of a focal plane for generating the computer graphics image;
the computer graphics image generation step of moving said viewpoint based on the moving distance of said viewpoint set at said setting step to generate the computer graphics image based on the moved viewpoint,
said computer graphics image generation step generating a plurality of computer graphics images corresponding to the viewpoints;
the averaged computer graphics image generation step of generating an averaged computer graphics image, said averaged computer graphics image being an average of said plurality of computer graphics images; and
the combined image generation step of combining said averaged computer graphics image generated at said averaged computer graphics image generation step with the real image to generate a combined image.

27. An image processing method for combining a real image with computer graphics image to generate a combined image, comprising:
the calculation step of calculating the moving distance of a viewpoint and the position of a focal plane for generating the computer graphics image according to the lens characteristics of an image capture step of capturing a real image;
the computer graphics image generation step of moving said viewpoint based on the moving distance of said viewpoint calculated at said calculation step to generate the computer graphics image based on the moved viewpoint,
said computer graphics image generation step generating a plurality of computer graphics images corresponding to the viewpoints;
the averaged computer graphics image generation step of generating an averaged computer graphics image, said averaged computer graphics image being an average of said plurality of computer graphics images; and
the combined image generation step of combining said averaged computer graphics image generated at said averaged computer graphics image generation step with the real image to generate a combined image.

28. The image processing method according to claim 26, further comprising the display step of displaying said combined image generated at said combined image generation step.

29. The image processing method according to claim 26, further comprising the control step of controlling the moving distance of the viewpoint and the position of the focal plane in the computer graphics image.

30. The image processing method according to claim 26, wherein said averaged computer graphics image generation step stores the generated computer graphics image in first memory, performs predetermined scaling for the value of pixels constituting said computer graphics image and adds the values of the pixels to the values of corresponding pixels of an image stored in second memory different from said first memory to restore the image.

31. The image processing method according to claim 30, wherein said averaged computer graphics image generation step generates an image having the average of the pixel values of pixels in the same position in a plurality of computer graphics images corresponding to said viewpoints.

32. The image processing method according to claim 30, wherein said averaged computer graphics image generation step generates an image having the weighted average of the pixel values of pixels in the same position in a plurality of computer graphics images corresponding to said viewpoints.

33. The image processing method according to claim 18, wherein said computer graphics image generation step re-sets a view volume so that the cross section of the view volume cut through the focal plane position does not change when said viewpoint is moved according to the moving distance of said viewpoint.

34. The image processing method according to claim 19, wherein said calculation step calculates the position of the focal plane of a computer graphics drawing system so that the focal plane position of the computer graphics drawing system is brought into coincidence with the focal plane of a image capture system and provides virtual base points in the computer graphics drawing system and the image capture system in any position different from the focal plane and common to the computer graphics drawing system and the image capture system to calculate the moving distance of the viewpoint so that the blur level at said base point in said computer graphics drawing system become equal to the blur level at said base point in the image capture system.

35. A program code for performing the image processing method according to claim 18.

36. A program code for performing the image processing method according to claim 19.

37. A program code for performing the image processing method according to claim 26.

38. A program code for performing the image processing method according to claim 27.

39. A computer-readable storage medium storing the program code set forth in claim 35.

40. A computer-readable storage medium storing the program code set forth in claim 36.

41. A computer-readable storage medium storing the program code set forth in claim 37.

42. A computer-readable storage medium storing the program code set forth in claim 38.

* * * * *

UNITED STATES PATENT AND TRADEMARK OFFICE
CERTIFICATE OF CORRECTION

PATENT NO.      : 6,717,586 B2
DATED           : April 6, 2004
INVENTOR(S)     : Masakazu Fujiki It is certified that error appears in the above-identified patent and that said Letters Patent is hereby corrected as shown below:

Drawings,
Sheet 10, Figure 10, item S1006, "BUFER" should read -- BUFFER --.

Column 2,
Line 45, "average computer" should read -- averaged computer --.
Line 61, "a image" should read -- an image --.

Column 3,
Line 6, "average computer" should read -- averaged computer --.

Column 4,
Line 18, "103 a" should read -- 103a --.
Line 19, "103B," should read -- 103b, -- and "stores" should read -- store --.
Line 20, "file" should read -- file. --.

Column 6,
Line 38, "502" should read -- S502 --.
Line 52, "form" should read -- from --.

Column 7,
Line 9, "image" should read -- images --.

Column 8,
Line 54, "blue" should read -- blur --.
Line 57, "is" should read -- are --.

Column 9,
Line 43, "embodiments" should read -- embodiments, --.
Line 58, "form" should read -- from --.

Column 12,
Line 67, "of a" should read -- of an --.

UNITED STATES PATENT AND TRADEMARK OFFICE
CERTIFICATE OF CORRECTION

PATENT NO. : 6,717,586 B2
DATED : April 6, 2004
INVENTOR(S) : Masakazu Fujiki

It is certified that error appears in the above-identified patent and that said Letters Patent is hereby corrected as shown below:

Column 13,
Line 7, "become" should read -- becomes --.

Column 16,
Line 1, "of a" should read -- of an --.
Line 8, "become" should read -- becomes --.

Signed and Sealed this

Fifth Day of April, 2005

JON W. DUDAS
*Director of the United States Patent and Trademark Office*